(12) United States Patent
Kepler et al.

(10) Patent No.: US 11,552,372 B2
(45) Date of Patent: Jan. 10, 2023

(54) INTEGRATED BUS BAR ELEMENT FOR A BATTERY, BATTERY AND VEHICLE

(71) Applicant: Farasis Energy (Ganzhou) Co., Ltd., Ganzhou (CN)

(72) Inventors: Keith Kepler, Bemont, CA (US); Jackson Edwards, Moscow, ID (US); Andrew Larson, Livermore, CA (US); Benjamin Zeiger, Boulder, CO (US)

(73) Assignee: FARASIS ENERGY (GANZHOU) CO., LTD., Ganzhou (CN)

( * ) Notice: Subject to any disclaimer, the term of this patent is extended or adjusted under 35 U.S.C. 154(b) by 282 days.

(21) Appl. No.: 16/864,978

(22) Filed: May 1, 2020

(65) Prior Publication Data

US 2020/0350549 A1    Nov. 5, 2020

Related U.S. Application Data

(60) Provisional application No. 62/842,774, filed on May 3, 2019, provisional application No. 62/842,796, filed on May 3, 2019.

(51) Int. Cl.
*H01M 50/505* (2021.01)
*H01R 25/16* (2006.01)
(Continued)

(52) U.S. Cl.
CPC ....... *H01M 50/505* (2021.01); *H01M 50/298* (2021.01); *H01M 50/503* (2021.01);
(Continued)

(58) Field of Classification Search
None
See application file for complete search history.

(56) References Cited

U.S. PATENT DOCUMENTS 5,357,184 A * 10/1994 McGowan .......... H02J 7/00304
                                                         361/833
2016/0315304 A1   10/2016 Biskup
(Continued)

FOREIGN PATENT DOCUMENTS

CN        104064820 A      9/2014
CN        206022495 U      3/2017
(Continued)

OTHER PUBLICATIONS www.espacenet.com machine translation of the detailed description of JP 2000-182506A. (Year: 2000).*

(Continued)

*Primary Examiner* — Gregg Cantelmo
(74) *Attorney, Agent, or Firm* — Volpe Koenig

(57) ABSTRACT

The present disclosure relates to the technical field of battery, and discloses an integrated bus bar element for a battery, a battery and a vehicle; wherein the integrated bus bar element comprises a bus bar (20, 20a, 20b), and a plurality of branch bars (28a-28j) for electrical connection to battery cells (10, 10a, 10b) respectively, and the bus bar (20, 20a, 20b) and the branch bars (28a-28j) are made of a single conductor and integrally formed as a single piece. The integrated bus bar element of the present disclosure eliminates the connection points between the bus bar and the branch bars, a step of connecting the bus bar and the branch bars is not required to be implemented during the battery assembly, thus the reliability and assembly convenience of the battery are greatly improved.

8 Claims, 3 Drawing Sheets

(51) Int. Cl.
  *H01M 50/583* (2021.01)
  *H01M 50/512* (2021.01)
  *H01M 50/503* (2021.01)
  *H01M 50/51* (2021.01)
  *H01M 50/298* (2021.01)

(52) U.S. Cl.
  CPC ......... *H01M 50/51* (2021.01); *H01M 50/512* (2021.01); *H01M 50/583* (2021.01); *H01R 25/161* (2013.01); *H01M 2200/103* (2013.01); *H01M 2220/20* (2013.01)

(56) References Cited

U.S. PATENT DOCUMENTS

| | | | |
|---|---|---|---|
| 2017/0062795 A1* | 3/2017 | Byun | .................. H01M 50/502 |
| 2019/0165351 A1 | 5/2019 | Jenner-Braunschmied et al. | |

FOREIGN PATENT DOCUMENTS

| | | | |
|---|---|---|---|
| CN | 109690824 A | | 4/2019 |
| JP | 2000182506 A | * | 6/2000 |
| JP | 2014103031 A | * | 6/2014 |
| JP | 2015141801 A | | 8/2015 |

OTHER PUBLICATIONS www.espacenet.com machine translation of the detailed description of JP 2014-103031A. (Year: 2014).*

\* cited by examiner

INTEGRATED BUS BAR ELEMENT FOR A BATTERY, BATTERY AND VEHICLE

CROSS REFERENCE TO RELATED APPLICATIONS

The application claims priorities of the U.S. provisional patent application No. 62/842,774, filed on May 3, 2019, entitled "Integrated battery bus bars and cell level fusing" and the U.S. provisional patent application No. 62/842,796, filed on May 3, 2019, entitled "Integrated bus bars and electrochemical cell connections," the content of two provisional patent applications are specifically and entirely incorporated herein by reference.

FIELD

The present disclosure relates to the technical field of battery, in particular to an integrated bus bar element for a battery. On the basis, the present disclosure also relates to a battery comprising the integrated bus bar element and a vehicle comprising the battery.

BACKGROUND

FIG. 1 is a schematic diagram of a power supply system for supplying an electrical equipment 16 with electrical power by using a battery consisting of a plurality of battery cells 10a, 10b. Wherein each of the battery cells is connected with a branch bar, and the electric energy transmitted via the branch bars passes through the bus bars 20a and 20b. In addition, fuses 22a, 22b, 22c and 22d are arranged on the branch bars; in case of a surge current, the fuses may break the electric connection between the battery cell and the electric equipment in order to protect the battery pack; when a failure of the battery occurs, the fuses may protect the electric device such as a vehicle.

As can be seen, the individual branch bar may, on the one hand, act as a power transmission medium to connect the bus bar with the battery cells, and on the other hand, can provide protection in the abnormal conditions. For this reason, there are many connection points in the power supply system, the connection points increase cost and complexity, and a breakdown such as connection failure is prone to occur at the connection points. For example, the traditional fusing element (fuse) needs to be provided with connection points at both ends, and the branch bars shall be supplied with connection elements for crimp connection to the battery cells, it causes inconvenience in assembly of the battery and low reliability of the battery pack.

SUMMARY

The present disclosure aims to overcome the defects in the prior art, such as inconvenience in assembly of the battery and low reliability of the battery pack, thus provides an integrated bus bar element for a battery, the integrated bus bar element is capable of significantly improving reliability of the battery by omitting a large number of connection steps between different members in the assembly of a battery.

In order to accomplish the above objects, a first aspect of the present disclosure provides an integrated bus bar element for a battery, the integrated bus bar element comprising a bus bar, and a plurality of branch bars for electrical connection to battery cells respectively, the bus bar and the branch bars are made of a single conductor and integrally formed as a monolithic piece.

A second aspect of the present disclosure provides a battery, comprising a battery pack consisting of a plurality of battery cells which are connected in series or in parallel via the aforementioned integrated bus bar element.

A third aspect of the present disclosure provides a vehicle comprising the aforementioned battery.

Due to the aforementioned technical solution, the present disclosure uses a single conductor such that the bus bar and the branch bars are integrally formed into a single piece, the connection points between the bus bar and the branch bars are eliminated, a step of connecting the bus bar and the branch bars is not required to be implemented during the battery assembly, thus the reliability and assembly convenience of the battery are greatly improved.

Figure 1:
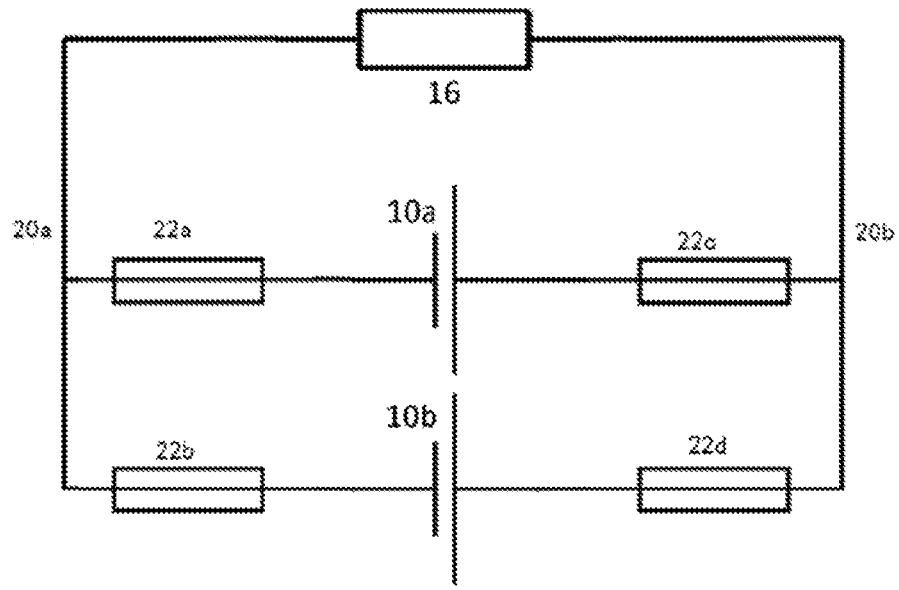
FIG. 1 is a schematic diagram of a power supply system for supplying electrical power by using a battery consisting of a plurality of battery cells.

DESCRIPTION OF REFERENCE SIGNS 10, 10a, 10b battery cell
16 electrical equipment
20, 20a, 20b bus bar
28a-28j branch bar
22, 22a-22j fuses
24, 24a-24j connection part
32 connecting hole
30a, 30b crimp surface
26a-26g integrated bus bar element

DETAILED DESCRIPTION

The following content describes the specific embodiments of the present disclosure in detail with reference to the accompanying drawings. It should be comprehended that the specific embodiments described herein merely serve to illustrate and explain the present disclosure, instead of limiting thereto.

Unless otherwise specified, the directional terms used in the present disclosure, such as "upper, lower, left, and right" generally refer to the upper, lower, left, and right directions shown in the reference drawings; "inner and outer" refer to the inside and outside relative to the profile of the component per se.

Figure 2:
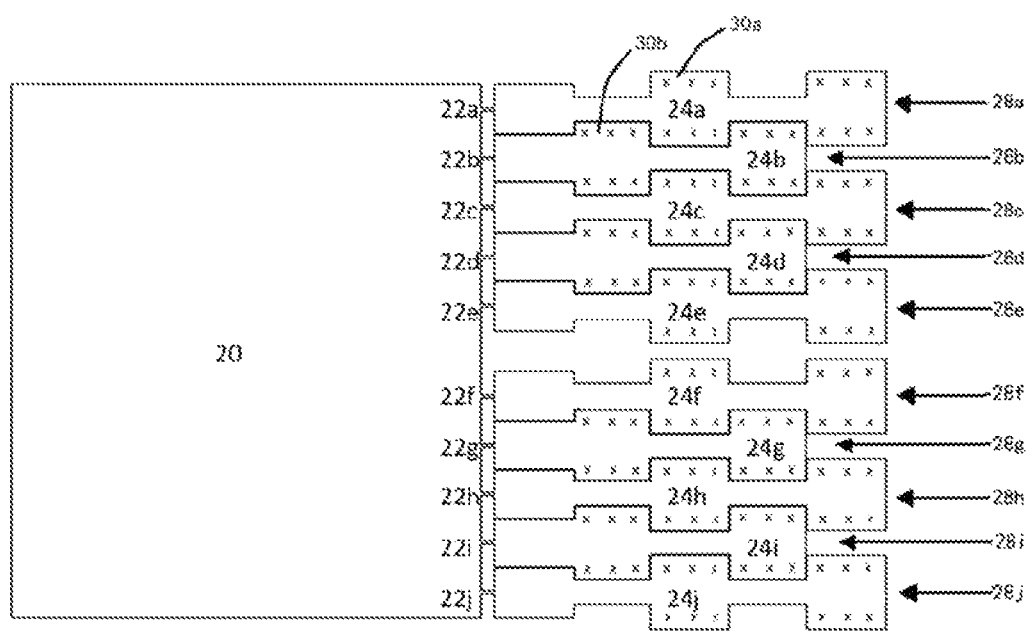
FIG. 2 illustrates a schematic structural view of an integrated bus bar element according to a preferred embodiment of the present disclosure.

Referring to FIG. 2, an integrated bus bar according to a preferred embodiment of the present disclosure is used to output power provided by a plurality of battery cells in a battery. The integrated bus bar element includes a bus bar 20, and a plurality of branch bars 28a-28j for electrically connecting to the battery cells respectively, the bus bar 20 and the branch bars 28a-28j are made of a single conductor and integrally formed as a single piece. In the preferred embodiment, the single conductor used for manufacturing the integrated bus bar element may be a sheet-like conductor, and a single piece having a bus bar 20 and ten branch bars 28a-28j is formed by cutting. That is, unlike the mode of the conventional technological process in which the bus bar and the branch bars are separately manufactured and then electrically connected, the present disclosure recites a manufacturing process in which the bus bar 20 and the bus bars 28a-28j are kept connected, thereby eliminating connection points (failure points) therebetween, saving a step of connecting the bus bar 20 and the branch bars 28a-28j in the battery assembly process, thus the reliability and the assembly convenience of the battery are significantly improved.

It should be understood that the integrated bus bar element of the present disclosure can be manufactured by other processing means such as stamping, it is not limited to the aforementioned cutting and forming manner, and/or can further include other auxiliary processing steps such as bending (e.g., the processing steps from FIG. 2 to FIG. 3) during the process of forming the final use state. In other embodiments, 6-12 branch bars (FIG. 4 illustrates 6 branch bars) may be integrally formed on the bus bar 20.

In the integrated bus bar shown in FIG. 2, each of the branch bars 28a-28j includes fuses 22a-22j and connection parts 24a-24j for connecting to the battery cells, respectively. Wherein the fuses 22a-22j can provide the equipment in a power supply system with a power-off protection in case of surge current or battery failure, and each of the connection parts 24a-24j may be connected with an individual battery cell. In other embodiments, each of the branch bars 28a-28j may be merely provided with one of the fuses and the connection part, such an arrangement can also reduce the number of connection points in the battery, and improve reliability and assembly convenience of the battery.

As previously mentioned, the integrated bus bar of the present disclosure can be formed by cutting the sheet-like conductor and subjecting to other auxiliary processing steps to produce the integrated bus bar in the final use state. For the sake of fully utilizing the raw materials and ensuring the reliable connection between the connection parts 24a-24j and the battery cells, at least a part of the adjacent connection parts 24a-24j are disposed to match with each other. In an unfolded state shown in FIG. 2, the connection parts 24a-24e are adjacent to each other so as to splice and form a plane, so are the connection parts 24f-24j.

Furthermore, each of the connection parts 24a-24j has at least one crimp surface 30a, 30b, and the crimp surfaces 30a, 30b are connected to the battery cells via a crimping mode. In an unfolded state, a width of the crimp surfaces 30a, 30b is larger than a width of the other portions of the connection parts 24a-24j, so as to reliably connect with the battery cells. In the preferred embodiment shown in FIG. 2, the crimp surfaces 30a, 30b of adjacent branch bars are alternately arranged at different length positions along the extension length of each of the branch bars 28a-28j, thereby allowing the crimp surfaces to have a larger joint area for reliable crimp with the battery cells.

Figure 3:
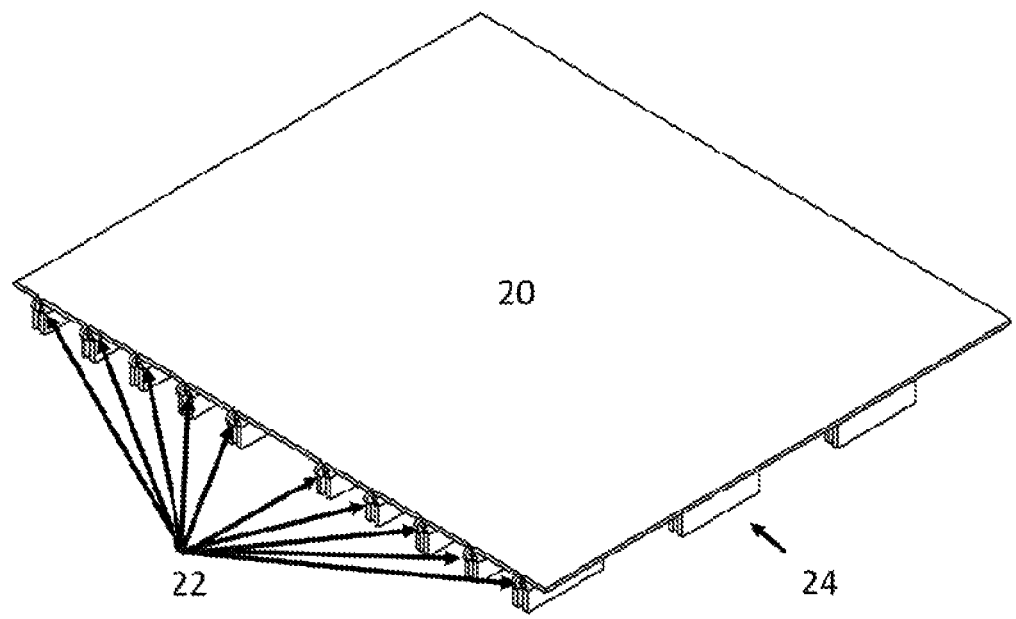
FIG. 3 shows a schematic structural view of the integrated bus bar element in FIG. 2 in a use state.
Figure 4:
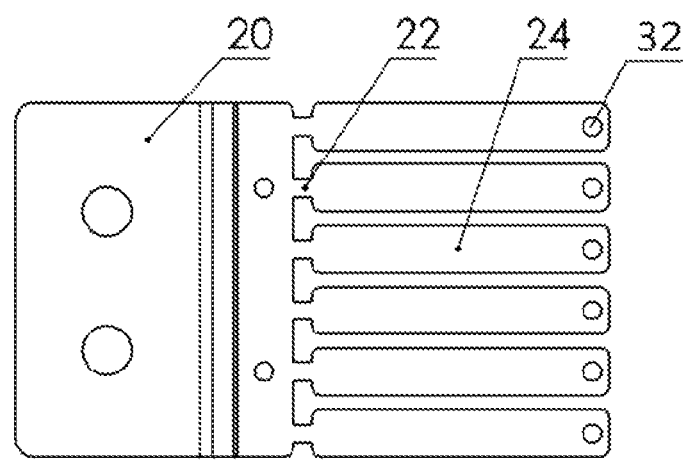
FIG. 4 illustrates a schematic structural view of an integrated bus bar element according to another preferred embodiment of the present disclosure.

FIG. 3 shows a schematic structural view of the integrated bus bar element in FIG. 2 in a use state, wherein the bus bar 20 is formed in a plate shape, and the fuses 22 are bent 180° from an edge of the bus bar 20, such that the connection part 24 is located underneath a lower side of the plate surface of the bus bar 20, thereby enabling connection of the battery cells at a side (lower side) opposite to the plate surface of the bus bar 20, and the battery is compact in its overall structure and prevents the battery cells from being exposed to the outside by a shielding effect of the bus bar 20. In the preferred embodiment, the crimp surface of the connection portion 24 is bent along a direction away from the bus bar 20 so as to facilitate crimp connection to the battery cells.

FIG. 4 illustrates a schematic structural view of an integrated bus bar element according to another preferred embodiment of the present disclosure, it also relates to a single conductor which is integrally formed by means of cutting and the like into a single piece consisting of a bus bar 20 and a plurality of branch bars. Each of the branch bars may be respectively provided with at least one of the fuses 22 and the connection part 24. For the sake of avoiding redundant description, the following content will be formulated mainly in regard to its differences from the foregoing embodiments.

In the integrated bus bar, each of the connection parts 24 is arranged spaced apart from each other, and is formed with a connection hole 32 for connecting with the respective battery cell, whereby the connection with the battery cells may be performed by using fasteners such as bolts. Wherein each of the connection parts 24 may be formed to have the same shape, thereby facilitating the manufacturing process at a low cost.

Figure 5:
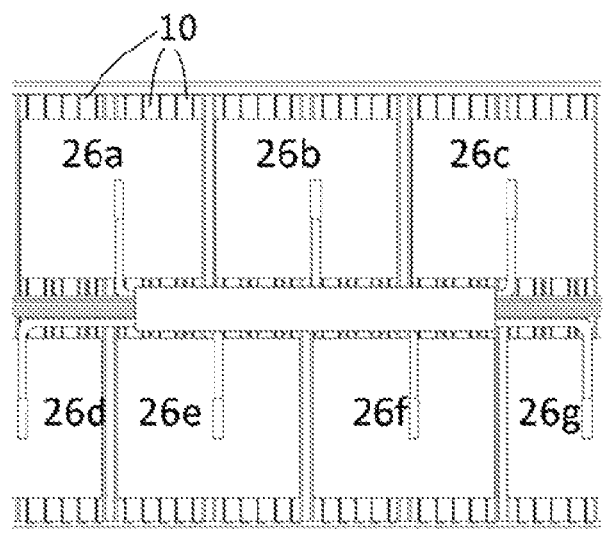
FIG. 5 is a schematic structural view of a battery according to a preferred embodiment of the present disclosure.
Figure 6:
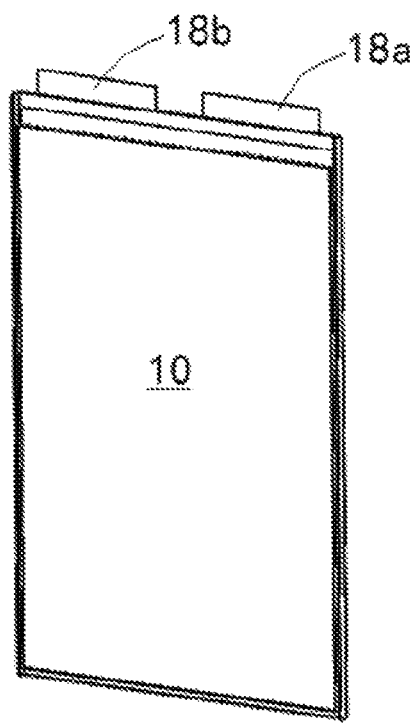
FIG. 6 shows a pouch cell of the battery in FIG. 5.

Referring to FIG. 5, the present disclosure further provides a battery comprising a battery pack consisting of a plurality of battery cells 10, which are connected in series or in parallel via the aforementioned integrated bus bars 26a-26g. The battery may be composed of a plurality of battery packs, each battery pack may include a plurality of (e.g., five) electrochemical cells connected in parallel, and the plurality of battery packs may be further connected in series to supply power to the outside. The battery cells may be pouch cells, so that the cells can be easily arranged in a column. As compared to cylindrical cells, pouch cells used in this embodiment have higher Ah rating, and high energy density due to better packaging efficiency. As shown in FIG. 6, the pouch cell may be provided with a polymer coated aluminum foil packaging and two thin foil tabs18a~18b which could be electrically connected to the crimp surfaces of the aforementioned integrated bus bars by crimping.

The present disclosure further provides a vehicle having the battery, such as an electric vehicle (EV), or a hybrid electric vehicle (HEV).

The above content describes the preferred embodiments of the present disclosure in detail with reference to the accompanying drawings, but the present disclosure is not limited thereto. A variety of simple modifications can be made in regard to the technical solutions of the present disclosure within the scope of the technical concept of the present disclosure, including a combination of individual specific technical features in any suitable manner. For the sake of avoiding the unnecessary repetition, a variety of possible combination modes are not further formulated in the present disclosure. However, such simple modifications and combinations thereof shall also be regarded as the content disclosed by the present disclosure, each of them falls into the protection scope of the present disclosure.

The invention claimed is:

1. An integrated bus bar element for a battery, the integrated bus bar element comprising a bus bar, and a plurality of branch bars for electrical connection to battery cells respectively, the bus bar and the branch bars are made of a single conductor and integrally formed as a monolithic piece, wherein each of the branch bars is formed with a fuse, respectively, wherein the bus bar is formed in a plate shape and has an upper plate surface and a lower plate surface that is opposite to the upper plate surface, and the fuses are bent 180° from edges of the bus bar, thereby enabling connection of the battery cells at a side opposite to the upper plate surface of the bus bar.

2. The integrated bus bar element for a battery of claim 1, wherein each of the branch bars includes connection parts for connecting to the battery cells, respectively.

3. The integrated bus bar element for a battery of claim 2, wherein the connection parts are arranged spaced apart from each other, and/or the connection parts are formed with a connection hole for connecting with the battery cells.

4. The integrated bus bar element for a battery of claim 2, wherein at least a part of the connection parts that are adjacent to each other are disposed to match with each other in an unfolded state.

5. The integrated bus bar element for a battery of claim 2, wherein the connection parts have crimp surfaces, and a width of the crimp surfaces is larger than a width of other portions of the connection parts in an unfolded state.

6. The integrated bus bar element for a battery of claim 1, wherein 6-12 branch bars are integrally formed on the bus bar.

7. A battery, comprising a battery pack consisting of a plurality of battery cells, wherein the plurality of battery cells are connected in series or in parallel via the integrated bus bar element according to claim 1.

8. A vehicle, comprising the battery according to claim 7.

* * * * *